US012775673B2

(12) United States Patent
Guo et al.

(10) Patent No.: US 12,775,673 B2
(45) Date of Patent: Oct. 27, 2026

(54) METHOD FOR REDUCING NOISE DURING AES DETECTION

(71) Applicant: HANGZHOU PUYU TECHNOLOGY DEVELOPMENT CO., LTD., Hangzhou (CN)

(72) Inventors: Ziyang Guo, Hangzhou (CN); Yang Zhao, Hangzhou (CN); Rui Li, Hangzhou (CN); Xiaofeng Yu, Hangzhou (CN); Dehuai Su, Hangzhou (CN); Xiaowei Zhu, Hangzhou (CN)

(73) Assignee: HANGZHOU PUYU TECHNOLOGY DEVELOPMENT CO., LTD., Hangzhou (CN)

( * ) Notice: Subject to any disclaimer, the term of this patent is extended or adjusted under 35 U.S.C. 154(b) by 987 days.

(21) Appl. No.: 18/080,773

(22) Filed: Dec. 14, 2022

(65) Prior Publication Data

US 2023/0214443 A1 Jul. 6, 2023

Related U.S. Application Data

(63) Continuation of application No. PCT/CN2021/099738, filed on Jun. 11, 2021.

(30) Foreign Application Priority Data

Jun. 14, 2020 (CN) ......................... 202010539508.4

(51) Int. Cl.
*G06F 17/10* (2006.01)
*G01J 3/28* (2006.01)
(Continued)

(52) U.S. Cl.
CPC ................ *G06F 17/10* (2013.01); *G01J 3/28* (2013.01); *G01J 3/443* (2013.01); *G01N 21/6404* (2013.01); *G01N 21/73* (2013.01)

(58) Field of Classification Search
CPC .... G06F 17/10; G01N 21/6404; G01N 21/73; G01J 3/28; G01J 3/443
See application file for complete search history.

(56) References Cited

U.S. PATENT DOCUMENTS

| | | | | |
|---|---|---|---|---|
| 6,987,564 | B2 * | 1/2006 | Gornushkin ........... | G01N 21/65 356/318 |
| 7,493,225 | B2 * | 2/2009 | Wang .................. | H01J 49/0027 702/109 |
| 2011/0181452 | A1 | 7/2011 | Raifel et al. | |

FOREIGN PATENT DOCUMENTS

| | | |
|---|---|---|
| CN | 103245654 A | 8/2013 |
| CN | 104954704 A | 9/2015 |

(Continued)

OTHER PUBLICATIONS

International Search Report dated Sep. 1, 2021 in International Application No. PCT/CN2021/099738. English translation attached.

(Continued)

*Primary Examiner* — Khai M Nguyen

(57) ABSTRACT

The present disclosure provides a method for reducing noise in AES detection, including steps: obtaining G based on a sub-array $\tilde{Z}$ of detection data; for each element in G, forming a set of data using three adjacent elements including the element in a column direction, and sorting the set of data in a descending order to obtain an array $\tilde{D}$; performing normalization processing on the array $\tilde{D}$ to obtain an array D; for each element in $\tilde{Z}$, forming a set of data using three adjacent elements including the element in the column direction, and sorting the set of data in a descending order to obtain an array U of m rows by n columns; calculating a noise difference value in the column direction, i.e., an array C of m rows by n−1 columns; formulating a noise array N of m rows by n columns; and constructing a new sub-array $P^N$.

2 Claims, 3 Drawing Sheets

(51) Int. Cl.

| | |
|---|---|
| ***G01J 3/443*** | (2006.01) |
| ***G01N 21/64*** | (2006.01) |
| ***G01N 21/73*** | (2006.01) |

(56) References Cited

FOREIGN PATENT DOCUMENTS

| | | | |
|---|---|---|---|
| CN | 105675455 | A | 6/2016 |
| CN | 109813660 | A | 5/2019 |
| CN | 109883547 | A | 6/2019 |
| CN | 111949919 | A | 11/2020 |
| WO | 2012081825 | A1 | 6/2012 |

OTHER PUBLICATIONS

First Office Action from corresponding Chinese Application No. 202010539508.4, dated Sep. 1, 2021. English translation attached.
Supplementary search from corresponding Chinese Application No. 202010539508.4, dated Dec. 19, 2021.
The Grant Notice from corresponding Chinese Application No. 202010539508.4, dated Jan. 11, 2022. English translation attached.
Ma, Xiaoguo et al. 'Application of a Modified of Wavelet Noise Removing to Noisy ICP-AES Spectra', Spectroscopy and Spectral Analysis, vol. 23, No. 3, Jun. 30, 2003 (Jun. 30, 2003).

* cited by examiner

METHOD FOR REDUCING NOISE DURING AES DETECTION

CROSS-REFERENCE TO RELATED APPLICATIONS

This application is a continuation of International Application NO. PCT/CN2021/099738, filed on Jun. 11, 2021, which claims priority to Chinese Patent Application No. 202010539508.4, entitled "METHOD FOR REDUCING NOISE IN AES DETECTION" and filed by HANGZHOU PUYU TECHNOLOGY DEVELOPMENT CO., LTD. on Jun. 14, 2020, the entire disclosures of which are incorporated here by reference.

FIELD

The present disclosure relates to detection, and more particularly, to a method for reducing noise in AES detection.

BACKGROUND

ICP-AES has become a main member among laboratory analysis instruments due to advantages of a low detection limit, a wide dynamic range, a wide detection waveband and the like, and is widely used in the fields of environments, semiconductors, medical treatment, food, metallurgy, nuclear industry and the like. In recent years, with the innovation of technologies and the increase in low content demands of detection substances, the improvement of ICP detection performance has become one of hotspots of manufacturers. The detection performance is directly derived from two factors, signal response and noise, and how to improve the signal-to-noise ratio is a main issue of the industry.

Some manufacturers start from detectors and have customized and developed low noise detectors. However, as restricted by the current domestic process level, this solution has a large cost for domestic instrument manufacturers and cannot ensure stable supply.

Some manufacturers focus on improving the response and improving the detection limit by increasing a light-transmitting aperture and the like. However, this changes the original optical system at the cost of degrading other parameters.

Meanwhile, a scientific research institution proposed and implemented to obtain better photo response by increasing the excitation efficiency by means of solution pretreatment, for example, special treatment near an atomizer to reduce surface adhesion of aerosols. Although this manner provides a certain improvement, reliability, stability, and applicability for all elements still need to be verified, and this manner cannot be industrialized at present.

SUMMARY

To solve the defects in the solutions of the related art, the present disclosure provides a method for reducing noise in AES detection to improve the detection limit.

An object of the present disclosure is implemented by the following technical solutions.

A method for reducing noise in AES detection is provided. The method for reducing noise in AES detection includes steps of:

A1, obtaining G based on a sub-array $\tilde{Z}$ of detection data:

$$G=(S_x\tilde{Z})^2+(S_y\tilde{Z})^2+(S_r\tilde{Z})^2+(S_l\tilde{Z})^2,$$

where $S_x$, $S_y$, $S_r$, and $S_l$ represents a sobel horizontal gradient operator, a sobel vertical gradient operator, a sobel right diagonal gradient operator, and a sobel left diagonal gradient operator, respectively, and $S_xZ^{\sim}$, $S_yZ^{\sim}$, $S_rZ^{\sim}$, and $S_rZ^{\sim}$ each represent convolution processing of a sobel operator on $Z^{\sim}$ with a step of 1, a convolution edge being processed by filling 0 or by symmetrization, an influence of the edge on the result being negligible, and where $$S_x = \begin{matrix} -1 & -2 & -1 \\ 0 & 0 & 0 \\ 1 & 2 & 1 \end{matrix},\ S_y = \begin{matrix} -1 & 0 & 1 \\ -2 & 0 & 2 \\ -1 & 0 & 1 \end{matrix},\ S_r = \begin{matrix} 0 & 1 & 2 \\ -1 & 0 & 1 \\ -2 & -1 & 0 \end{matrix},\ S_t = \begin{matrix} -2 & -1 & 0 \\ -1 & 0 & 1 \\ 0 & 1 & 2 \end{matrix},$$

and a size of $\tilde{Z}$ is (m, n);

A2, adding one column of zero values to both a left end and a right end of G for only a calculation purpose in this step without changing an original size of G, and recording the added columns as a 0-th column and a (n+1)-th column; and for each element in G, forming a set of data using three elements including the element and a previous element and a next element of the element in a column direction, and sorting the set of data in a descending order: $G_{i,d} \geq G_{i,e} \geq G_{i,f}$, to obtain an array $\tilde{D}$:

$$\tilde{D}_{i,j} = \frac{\alpha}{G_{i,d}} + \frac{\beta}{G_{i,e}} + \frac{\gamma}{G_{i,f}},$$

where $\alpha=0.618$, $\beta=(1-\alpha)*\alpha$, and $\gamma=(1-\alpha)^2$; and d, e, and f are different from each other and are each taken from a set {j, (j−1), (j+1)}, where $1 \leq i \leq m$ and $1 \leq j \leq n$;

A3, performing normalization processing on the array $\tilde{D}$ to obtain an array D;

A4, adding one column of zero values to both a left end and a right end of $\tilde{Z}$ for only a calculation purpose in this step without changing an original size of $\tilde{Z}$, and recording the added columns as a 0-th column and a (n+1)-th column; and for each element in $\tilde{Z}$, forming a set of data using three elements including the element in $\tilde{Z}$ and a previous element and a next element of the element in $\tilde{Z}$ in the column direction, and sorting the set of data in a descending order: $\tilde{Z}_{i,g} \geq \tilde{Z}_{i,h} \geq \tilde{Z}_{i,k}$, to obtain an array U of m rows by n columns:

$$U_{i,j} = \sqrt{\alpha*(\tilde{Z}_{mean} - \tilde{Z}_{i,k})^2 + \beta*(\tilde{Z}_{mean} - \tilde{Z}_{i,h})^2 + \gamma*(\tilde{Z}_{mean} - \tilde{Z}_{i,g})^2},$$

where g, h, and k are different from each other and are each taken from a set {j, (j−1), (j+1)}; and $$\tilde{Z}_{mean} = \frac{1}{3}(\tilde{Z}_{i,j} + \tilde{Z}_{i,j-1} + \tilde{Z}_{i,j+1}),$$

where $1 \leq i \leq m$ and $1 \leq j \leq n$;

A5, calculating a noise difference value in the column direction, the noise difference value being an array C of m rows by n−1 columns:

$$C_{i,j} = \frac{\tilde{Z}_{i,j}}{\tilde{Z}_{j\sim max}} * \sum_{k=1}^{m} 0.5 * \left[D_{i,j} * \left(\tilde{Z}_{i,j+1} - \tilde{Z}_{i,j}\right) + U_{i,j}\right],$$

where $\tilde{Z}_{j\sim max}$ is a maximum value of a column in which the element is located, 1≤i≤m, and 1≤j≤n;

A6, formulating a noise array N of m rows by n columns as:

$$\begin{cases} N_{i,x} = 0 \; 1 \le i \le m \\ N_{i,j+1} = N_{i,j} + C_{i,j} \; 1 \le i \le m, \; 1 \le j < n, \; j \ge x+1 \\ N_{i,j-1} = N_{i,j} - C_{i,j-1} 1 \le i \le m, \; 1 < j < n, \; j < x \end{cases},$$

where x is a column coordinate of a maximum value in the array $\tilde{Z}$; and

A7, constructing a new sub-array $P^N$:

$$P_{i,j}^{N} = \tilde{Z}_{i,j} - N_{i,j},$$

where 1≤i≤m and 1≤j≤n.

Compared with the related art, the present disclosure has the following beneficial effects.

The noise caused by non-uniform response of a detector device, differences in attributes, and light distribution is similar in each frame, and the influence of the noise is reduced by processing each image frame through an algorithm, thereby reducing the fluctuation in a time domain, reducing data variance, and improving the detection limit.

BRIEF DESCRIPTION OF THE DRAWINGS

The disclosed content of the present disclosure will become more understandable by referring to the accompanying drawings. It will be readily understood by those skilled in the art that these drawings are merely used for illustrating the technical solutions of the present disclosure, and are not intended to limit the scope of the present disclosure. In the drawings.

DETAILED DESCRIPTION

FIGS. 1 to 5 and the following description describe optional embodiments of the present disclosure to teach those skilled in the art about how to implement and reproduce the present disclosure. In order to teach the technical solutions of the present disclosure, some conventional aspects have been simplified or omitted. It should be understood by those skilled in the art that variations or replacements originating from these embodiments will be within the scope of the present disclosure. Those skilled in the art should understand that the following features can be combined in various ways to form a plurality of variants of the present disclosure. Thus, the present disclosure is not limited to the following optional embodiments, but is only defined by the claims and their equivalents.

Embodiment 1

Figure 1:
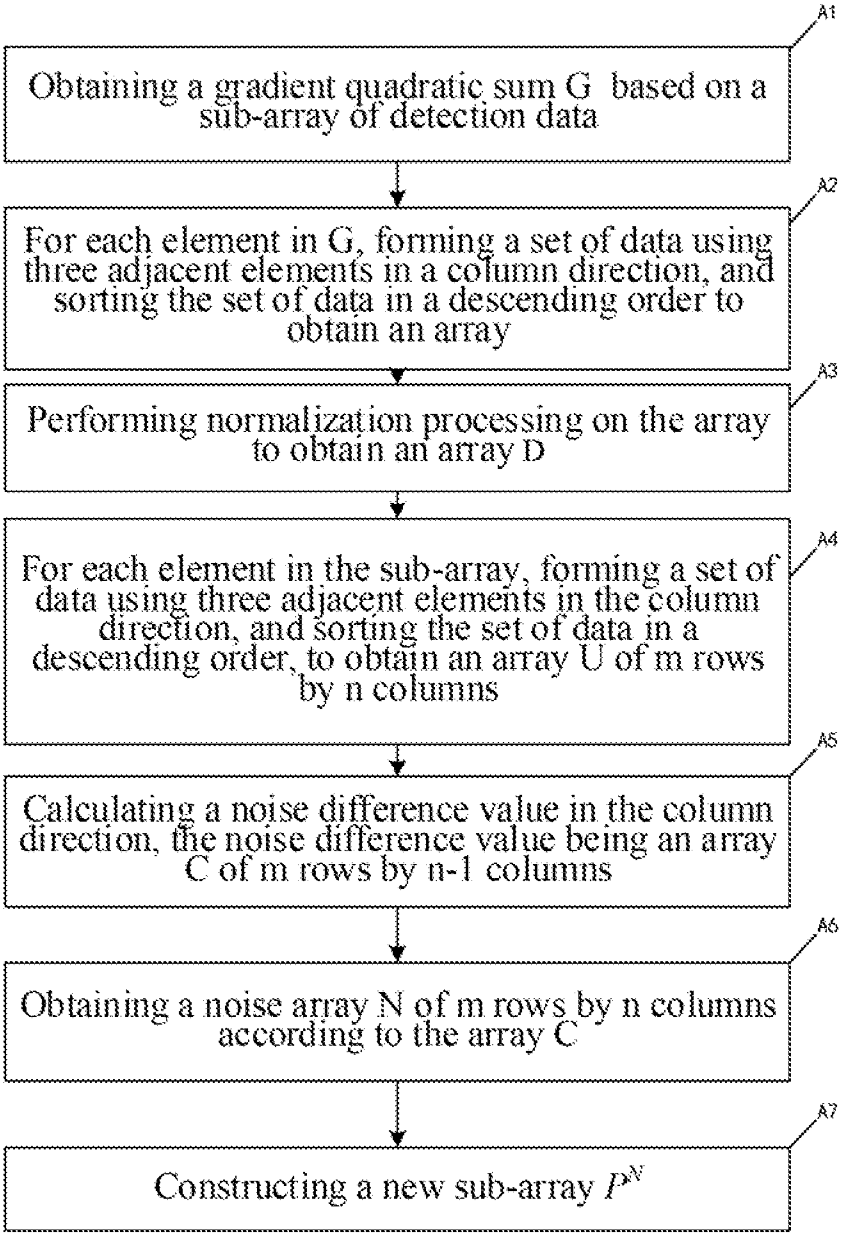
FIG. 1 is a flowchart of a method for reducing noise in AES detection according to an embodiment of the present disclosure.
Figure 2:
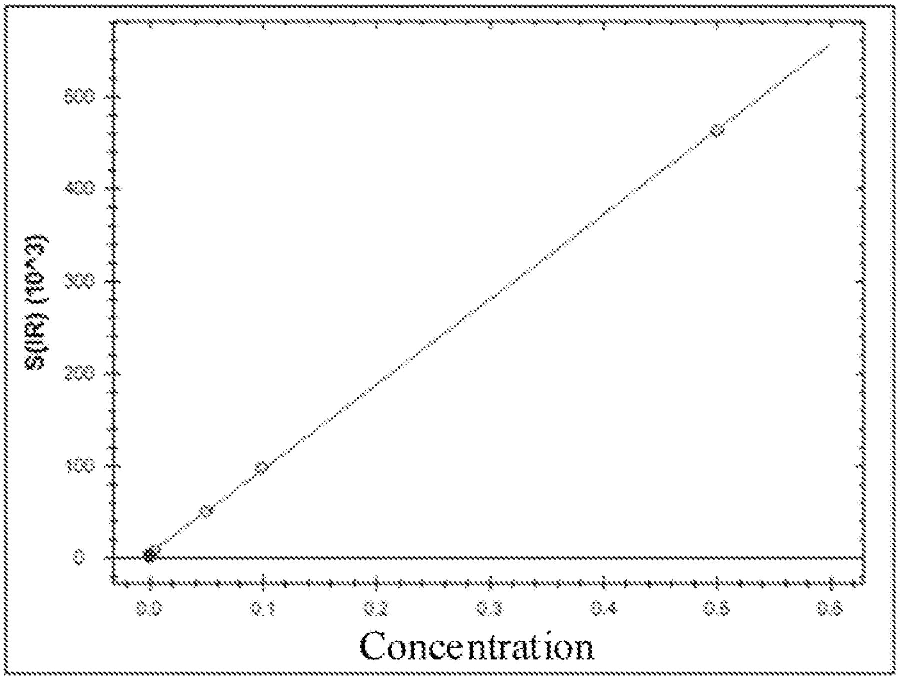
FIG. 2 is a standard curve of Ba233.525 according to an embodiment of the present disclosure.
Figure 3:
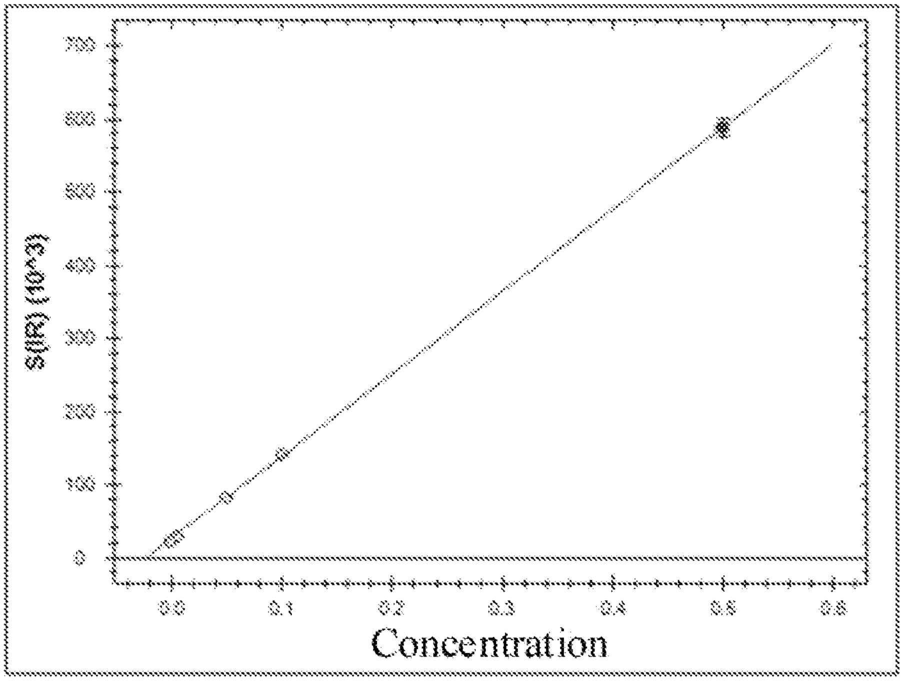
FIG. 3 is a standard curve of Cu324.754 according to an embodiment of the present disclosure.
Figure 4:
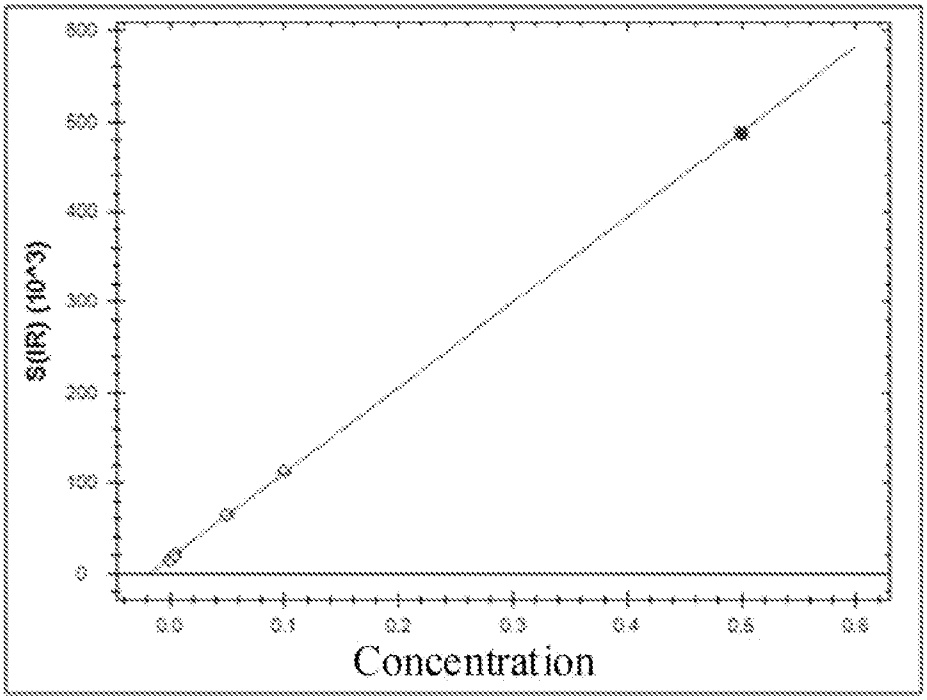
FIG. 4 is a standard curve of Cr283.563 according to an embodiment of the present disclosure.
Figure 5:
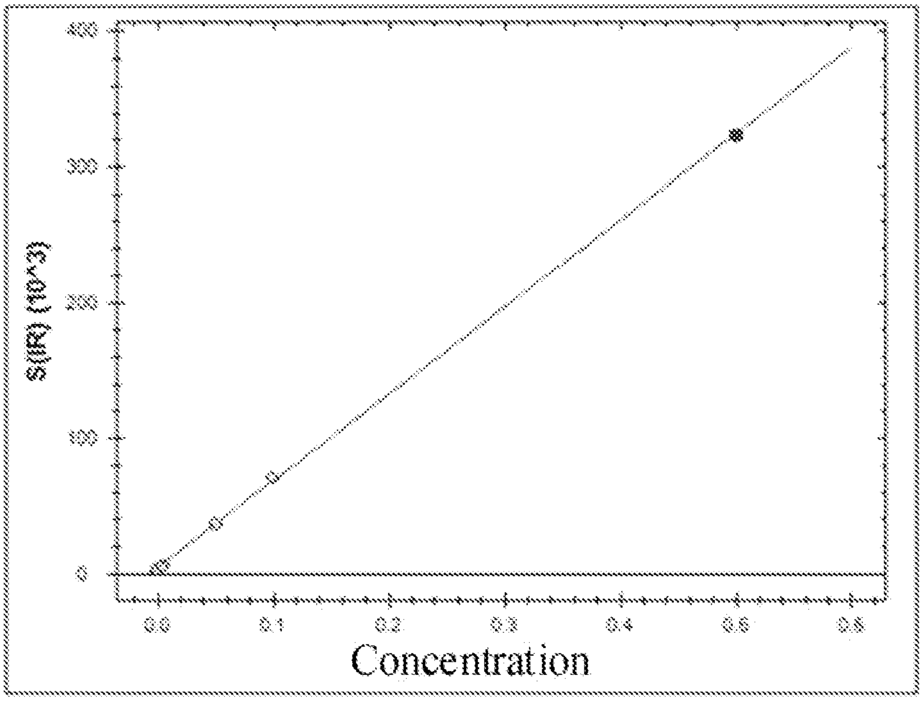
FIG. 5 is a standard curve of Mn257.610 according to an embodiment of the present disclosure.

FIG. 1 schematically shows a flowchart of a method for reducing noise in AES detection according to an embodiment of the present disclosure. As illustrated in FIG. 1, the method for reducing noise in AES detection includes the following steps A1 to A7:

At step A1, a multi-gradient quadratic sum G is obtained based on a sub-array $\tilde{Z}$ of detection data. A specific manner is as follows: since an image of a real object generated by an optical system is a Gaussian distribution two-dimensional light spot, and data read by a detector is also a two-dimensional array, introducing Sobel operators including a vertical operator, a horizontal operator, and diagonal operators in two directions, which are recorded as $S_x$, $S_y$, $S_r$, and $S_l$; and $$G=(S_x\tilde{Z})^2+(S_y\tilde{Z})^2+(S_r\tilde{Z})^2+(S_l\tilde{Z})^2,$$

where $$S_x = \begin{matrix} -1 & -2 & -1 \\ 0 & 0 & 0 \\ 1 & 2 & 1 \end{matrix},$$

$$S_y = \begin{matrix} -1 & 0 & 1 \\ -2 & 0 & 2 \\ -1 & 0 & 1 \end{matrix},$$

$$S_r = \begin{matrix} 0 & 1 & 2 \\ -1 & 0 & 1 \\ -2 & -1 & 0 \end{matrix},$$

$$S_l = \begin{matrix} -2 & -1 & 0 \\ -1 & 0 & 1 \\ 0 & 1 & 2 \end{matrix},$$

and a size of $\tilde{Z}$ is (m, n).

At step A2, one column of zero values is added to both a left end and a right end of G for only a calculation purpose in this step without changing an original size of G, and the added columns are recorded as a 0-th column and a (n+1)-th column; and for each element in G, a set of data is formed by using three elements comprising the element and a previous element and a next element of the element in a column direction, and the set of data is sorted in a descending order: $G_{i,d} \ge G_{i,e} \ge G_{i,f}$, to obtain an array $\tilde{D}$:

$$\tilde{D}_{i,j} = \frac{\alpha}{G_{i,d}} + \frac{\beta}{G_{i,e}} + \frac{\gamma}{G_{i,f}},$$

where α=0.618, β=(1−α)*α, and γ=(1−α)$^2$; and d, e, and f are different from each other and are each taken from a set {j, (j−1), (j+1)}, where 1≤i≤m and 1≤j≤n.

At step A3, normalization processing is performed on the array $\tilde{D}$, i.e., each element in the array is divided by a sum of values in a column where the element is located to obtain an array D.

At step A4, one column of zero values is added to both a left end and a right end of $\tilde{Z}$ for only a calculation purpose in this step without changing an original size of $\tilde{Z}$, and the added columns are recorded as a 0-th column and a (n+1)-th column; and for each element in $\tilde{Z}$, a set of data is formed by using three elements including the element in $\tilde{Z}$ and a previous element and a next element of the element in $\tilde{Z}$ in the column direction, and the set of data is sorted in a descending order: $\tilde{Z}_{i,g} \geq \tilde{Z}_{i,h} \geq \tilde{Z}_{i,k}$, to obtain an array U of in rows by n columns:

$$U_{i,j} = \sqrt{\alpha * (\tilde{Z}_{mean} - \tilde{Z}_{i,k})^2 + \beta * (\tilde{Z}_{mean} - \tilde{Z}_{i,h})^2 + \gamma * (\tilde{Z}_{mean} - \tilde{Z}_{i,g})^2},$$

where g, h, and k are different from each other and are each taken from a set {j, (j−1), (j+1)}; and $$\tilde{Z}_{mean} = \frac{1}{3}(\tilde{Z}_{i,j} + \tilde{Z}_{i,j-1} + \tilde{Z}_{i,j+1}),$$

where $1 \leq i \leq m$ and $1 \leq j \leq n$.

At step A5, a noise difference value in the column direction is calculated, and the noise difference value is an array C of m rows by n−1 columns:

$$C_{i,j} = \frac{\tilde{Z}_{i,j}}{\tilde{Z}_{j\sim max}} * \sum_{k=1}^{m} 0.5 * [D_{i,j} * (\tilde{Z}_{i,j+1} - \tilde{Z}_{i,j}) + U_{i,j}],$$

where $\tilde{Z}_{j\sim max}$ is a maximum value of a column in which the element is located, $1 \leq i \leq m$, and $1 \leq j \leq n$.

At step A6, a noise array N of m rows by n columns is formulated as:

$$\begin{cases} N_{i,x} = 0 \quad 1 \leq i \leq m \\ N_{i,j+1} = N_{i,j} + C_{i,j} \quad 1 \leq i \leq m,\ 1 \leq j < n,\ j \geq x+1 \\ N_{i,j-1} = N_{i,j} - C_{i,j-1} \quad 1 \leq i \leq m,\ 1 < j < n,\ j < x \end{cases},$$

where x is a column coordinate of a maximum value in the array $\tilde{Z}$.

At step A7, a new sub-array $P^N$ is constructed:

$$P^N_{i,j} = \tilde{Z}_{i,j} - N_{i,j},$$

where $1 \leq i \leq m$ and $1 \leq j \leq n$.

Example 2

The method for reducing noise in AES detection according to Example 1 of the present disclosure was applied in ICP-AES.

In this application example, Ba233.525, Cu324.754, Cr283.563, and Mn257.610 were used for testing:

1. A standard curve for Ba233.525, a standard curve for Cu324.754, a standard curve for Cr283.563, and a standard curve for Mn257.610 were constructed and are as illustrated in FIG. 2 to FIG. 5, respectively;
2. The instrument detection limit, i.e., 3 times a standard deviation, was detected by loading a blank water sample without adding an algorithm, and the data is as follows (two groups in the middle are taken as controls).

Test Group 1

| | Element | | | |
|---|---|---|---|---|
| | Ba4554(45) ppm | Cr2835(72) ppm | Cu3247(63) ppm | Mn2576(79) ppm |
| Mean | 0.000292 | 0.004268 | 0.005231 | 0.000033 |
| Standard deviation | 0.000020 | 0.000128 | 0.000098 | 0.000005 |
| RSD(%) | 6.701030 | 2.999182 | 1.881301 | 16.241564 |
| =1 | 0.000297 | 0.004136 | 0.005307 | 0.000038 |
| =2 | 0.000305 | 0.004288 | 0.005204 | 0.000026 |
| =3 | 0.000287 | 0.004400 | 0.005059 | 0.000033 |
| =4 | 0.000280 | 0.004422 | 0.005190 | 0.000031 |
| =5 | 0.000327 | 0.004169 | 0.005188 | 0.000031 |
| =6 | 0.000301 | 0.004065 | 0.005213 | 0.000028 |
| =7 | 0.000277 | 0.004321 | 0.005378 | 0.000032 |
| =8 | 0.000265 | 0.004333 | 0.005310 | 0.000042 |

Test Group 2

| | Element | | | |
|---|---|---|---|---|
| | Ba4554(45) ppm | Cr2835(72) ppm | Cu3247(63) ppm | Mn2576(79) ppm |
| Mean | 0.000108 | 0.000964 | 0.002402 | 0.000180 |
| Standard deviation | 0.000013 | 0.000104 | 0.000067 | 0.000012 |
| RSD(%) | 11.678056 | 10.776474 | 2.784478 | 6.503151 |
| =1 | 0.000111 | 0.000836 | 0.002389 | 0.000163 |
| =2 | 0.000106 | 0.000910 | 0.002493 | 0.000188 |
| =3 | 0.000089 | 0.001033 | 0.002470 | 0.000203 |
| =4 | 0.000096 | 0.000935 | 0.002362 | 0.000171 |
| =5 | 0.000104 | 0.000845 | 0.002363 | 0.000175 |
| =6 | 0.000114 | 0.001142 | 0.002343 | 0.000178 |
| =7 | 0.000130 | 0.001031 | 0.002323 | 0.000183 |
| =8 | 0.000117 | 0.000978 | 0.002475 | 0.000180 |

1. Example 1 was used to process original sub-array data corresponding to the above test groups, and the results are shown below.

Test Group 1 after Algorithm Processing

| | Element | | | |
|---|---|---|---|---|
| | Ba4554(45) ppm | Cr2835(72) ppm | Cu3247(63) ppm | Mn2576(79) ppm |
| Mean | 0.000111 | 0.002244 | 0.002972 | 0.000024 |
| Standard deviation | 0.000018 | 0.000102 | 0.000075 | 0.000004 |
| RSD(%) | 16.702250 | 4.565163 | 2.536015 | 18.294774 |
| =1 | 0.000111 | 0.002172 | 0.002994 | 0.000031 |
| =2 | 0.000112 | 0.002237 | 0.002962 | 0.000026 |
| =3 | 0.000107 | 0.002351 | 0002923 | 0.000025 |
| =4 | 0.000107 | 0.002385 | 0.002961 | 0.000023 |
| =5 | 0.000146 | 0.002157 | 0.002916 | 0.000019 |
| =6 | 0.000117 | 0.002083 | 0.002865 | 0.000019 |
| =7 | 0.000103 | 0.002271 | 0.003084 | 0.000020 |
| =8 | 0.000079 | 0.002294 | 0.003071 | 0.000027 |

Test Group 2 after Algorithm Processing

| | Element | | | |
|---|---|---|---|---|
| | Ba4554(45) ppm | Cr2835(72) ppm | Cu3247(63) ppm | Mn2576(79) ppm |
| Mean | −0.000105 | 0.000266 | 0.002736 | 0.000180 |
| Standard | 0.000011 | 0.000092 | 0.000050 | 0.000009 |

-continued

| | Element | | | |
|---|---|---|---|---|
| | Ba4554(45) ppm | Cr2835(72) ppm | Cu3247(63) ppm | Mn2576(79) ppm |
| deviation | | | | |
| RSD(%) | −10.856405 | 34.653129 | 1.833579 | 5.139528 |
| =1 | −0.000118 | 0.000116 | 0.002717 | 0.000168 |
| =2 | −0.000097 | 0.000251 | 0.002669 | 0.000186 |
| =3 | −0.000122 | 0.000359 | 0.002662 | 0.000197 |
| =4 | −0.000102 | 0.000252 | 0.002762 | 0.000173 |
| =5 | −0.000098 | 0.000166 | 0.002739 | 0.000175 |
| =6 | −0.000114 | 0.000391 | 0.002755 | 0.000180 |
| =7 | −0.000094 | 0.000315 | 0.002792 | 0.000187 |
| =8 | −0.000095 | 0.000283 | 0.002791 | 0.000177 |

What is claimed is:

1. A method for reducing noise in AES detection, comprising steps of:

obtaining G based on a sub-array $\tilde{Z}$ of detection data:

$G=(S_x\tilde{Z})+(S_y\tilde{Z})^2+(S_r\tilde{Z})^2+(S_l\tilde{Z})^2$, where $S_x$, $S_y$, $S_r$, and $S_l$ represents a sobel horizontal gradient operator, a sobel vertical gradient operator, a sobel right diagonal gradient operator, and a left diagonal gradient operator, respectively, and $S_xZ^{\sim}$, $S_yZ^{\sim}$, $S_rZ^{\sim}$, and $S_rZ^{\sim}$ each represent convolution processing of a sobel operator on Z with a step of 1, a convolution edge being processed by filling 0 or by symmetrization, an influence of the edge on a result being negligible, and where $$S_x = \begin{matrix} -1 & -2 & -1 \\ 0 & 0 & 0 \\ 1 & 2 & 1 \end{matrix},$$

$$S_y = \begin{matrix} -1 & 0 & 1 \\ -2 & 0 & 2 \\ -1 & 0 & 1 \end{matrix},$$

$$S_r = \begin{matrix} 0 & 1 & 2 \\ -1 & 0 & 1 \\ -2 & -1 & 0 \end{matrix},$$

$$S_l = \begin{matrix} -2 & -1 & 0 \\ -1 & 0 & 1 \\ 0 & 1 & 2 \end{matrix},$$

and a size of $\tilde{Z}$ is (m,n);

adding one column of zero values to both a left end and a right end of G for only a calculation purpose in this step without changing an original size of G and recording the added columns as a 0-th column and a (n+1)-th column; and for each element in G, forming a set of data using three elements comprising the element and a previous element and a next element of the element in a column direction, and sorting the set of data in a descending order: $G_{i,d} \geq G_{i,e} \geq G_i$, to obtain an array $\tilde{D}$:

$$\tilde{D}_{i,j} = \frac{\alpha}{G_{i,d}} + \frac{\beta}{G_{i,e}} + \frac{\gamma}{G_{i,f}},$$

where $\alpha=0.618$, $\beta=(1-\alpha)*\alpha$ and $\gamma=(1-\alpha)^2$; and d, e, and f are different from each other and are each taken from a set {j,(j−1),(j+1)}, where 1≤i≤m and 1≤j≤n;

performing normalization processing on the array $\tilde{D}$ to obtain an array D;

adding one column of zero values to both a left end and a right end of $\tilde{Z}$ for only a calculation purpose in this step without changing an original size of $\tilde{Z}$, and recording the added columns as a 0-th column and a (n+1)-th column; and for each element in $\tilde{Z}$, forming a set of data using three elements comprising the element in $\tilde{Z}$ and a previous element and a next element of the element in $\tilde{Z}$ in the column direction, and sorting the set of data in a descending order: $\tilde{Z}_{i,g} \geq \tilde{Z}_{i,b} \geq \tilde{Z}_{i,k}$, to obtain an array of m rows by n columns:

$$U_{i,j} = \sqrt{\alpha * (\tilde{Z}_{mean} - \tilde{Z}_{i,k})^2 + \beta * (\tilde{Z}_{mean} - \tilde{Z}_{i,h})^2 + \gamma * (\tilde{Z}_{mean} - \tilde{Z}_{i,g})^2},$$

where g, h, and k are different from each other and are each taken from a set {j,(j−1),(j+1)}; and $$\tilde{Z}_{mean} = \frac{1}{3}(\tilde{Z}_{i,j} + \tilde{Z}_{i,j-1} + \tilde{Z}_{i,j+1}),$$

where 1≤i≤m and 1≤j≤n;

calculating a noise difference value in the column direction, the noise difference value being an array of m rows by n−1 columns:

$$C_{i,j} = \frac{\tilde{Z}_{i,j}}{\tilde{Z}_{j\sim max}} * \sum\nolimits_{i=1}^{m} 0.5 * [D_{i,j} * (\tilde{Z}_{i,j+1} - \tilde{Z}_{i,j}) + U_{i,j}],$$

where $\tilde{Z}_{j \cdot max}$ is a maximum value of a column in which the element is located, 1≤i≤m, and 1≤j≤n;

formulating a noise array N of m rows by n columns as:

$$\begin{cases} N_{i,x} = 0 \quad 1 \leq i \leq m \\ N_{i,j+1} = N_{i,j} + C_{i,j} \quad 1 \leq i \leq m,\ 1 \leq j < n,\ j \geq x+1 \\ N_{i,j-1} = N_{i,j} - C_{i,j-1} \quad 1 \leq i \leq m,\ 1 < j < n,\ j < x \end{cases},$$

where x is a column coordinate of a maximum value in the array $\tilde{Z}$; and constructing a new sub-array $P^N$:

$$P^N_{i,j} = \tilde{Z}_{i,j} - N_{i,j},$$

where 1≤i≤m and 1≤j≤n.

2. The method for reducing noise in AES detection according to claim 1, wherein the normalization processing is performed by:

dividing each element by a sum of values in a column where the element is located, to obtain the array D.

* * * * *